(12) United States Patent
Rhiger et al.

(10) Patent No.: US 7,439,518 B2
(45) Date of Patent: Oct. 21, 2008

(54) MULTI-LAYER PIXELLATED GAMMA-RAY DETECTOR

(75) Inventors: David R. Rhiger, Santa Barbara, CA (US); Leonard P. Chen, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/732,610

(22) Filed: Apr. 4, 2007

(65) Prior Publication Data

US 2007/0235655 A1  Oct. 11, 2007

Related U.S. Application Data (60) Provisional application No. 60/790,037, filed on Apr. 7, 2006.

(51) Int. Cl.
*G01T 1/24* (2006.01)
(52) U.S. Cl. .............................. 250/370.13; 250/370.09
(58) Field of Classification Search ............ 250/370.01, 250/370.08, 370.09, 370.13
See application file for complete search history.

(56) References Cited

U.S. PATENT DOCUMENTS

| | | | |
|---|---|---|---|
| 7,166,848 B2 * | 1/2007 | El-Hanany et al. | 250/370.09 |
| 2007/0134906 A1 * | 6/2007 | Nygard | 438/618 |

OTHER PUBLICATIONS

Shin Watanabe et al., "CdTe Stacked Detectors for Gamma-Ray Detection", IEEE Transactions on Nuclear Science, IEEE Service Center, New York, NY, vol. 49, No. 3, Jun. 2002.

Nishizawa, H. et al., "Response Calculation of a Stacked CdZnTe Detector for 16N Gamma-Ray Measurement", Nuclear Instruments & Methods in Physics Research, Section A: Accelerators, Spectrometers, Detectors and Associated Equipment; Elsevier, Amsterdam, NL, vol. 463, No. 1-2, May 1, 2001, pp. 268-274.

* cited by examiner

*Primary Examiner*—David P. Porta
*Assistant Examiner*—Faye Boosalis
(74) *Attorney, Agent, or Firm*—Leonard A. Alkov (57) ABSTRACT

A method and apparatus for detecting gamma-rays is provided, wherein the gamma-ray detector apparatus includes a plurality of detector elements arranged in a stacked configuration. Each of the plurality of detector elements may include, a detector wafer having at least one anode separated from a cathode via a wafer material, wherein the wafer material includes a wafer material thickness d, and a wafer interface, wherein the wafer interface is electrically connected to the at least one anode.

19 Claims, 12 Drawing Sheets

Prior Art

MULTI-LAYER PIXELLATED GAMMA-RAY DETECTOR

RELATED APPLICATIONS

This Application claims priority of U.S. Provisional Patent Application No. 60/790,037, filed Apr. 7, 2006, entitled "Multi-layer pixellated gamma ray detector", by David R. Rhiger and Leonard P. Chen, the contents of which are hereby incorporated by reference herein in its entirety.

FIELD OF THE INVENTION

The present invention relates generally to gamma-ray detection and more particularly to semi-conductor gamma-ray detectors.

BACKGROUND OF THE INVENTION

Gamma-ray spectrometers, such as that described in U.S. Pat. No. 5,616,925 to Rhiger et al., entitled "Gamma-ray Detector with Improved Resolution and Method of Fabrication", are instruments that are used in a wide variety of scientific and industrial applications to quantify the energy and relative intensities of gamma-rays produced by a source. These spectrometers typically include semiconductor materials that absorb the energy of incident gamma-rays and convert the absorbed energy into an electronic signal that is proportional to the energy deposited in the detector. One type of semiconductor material that is preferred for use in gamma-ray spectroscopy when the detector must operate without cryogenic cooling is Cadmium Zinc Telluride or CdZnTe (CZT). Simple CZT detectors can be made by creating an electric field within a block or wafer of CZT material by applying a voltage between metal contacts disposed on opposite faces of the block or wafer. When an incident gamma-ray is absorbed by the CZT, its energy goes into the creation of a large quantity of electron-hole pairs within a relatively small region, wherein the number of electron-hole pairs are proportional to the energy deposited by the incident gamma-ray. The charge carriers then drift in the electric field toward their respective contacts (i.e. from cathode to anode in the case of electrons). The motion of these carriers in the electric field produce an output current in external circuitry which may be represented as a pulse whose height is proportional to the number of electron-hole pairs. Thus, if all of the gamma-rays that are incident on the CZT detector have the same energy, then the distribution in the pulse height spectrum should form a very narrow peak.

Unfortunately, current CZT devices include some significant disadvantages. One such disadvantage involves the size of the CZT material required to convert incident gamma-rays into electrical energy with sufficient resolution. For example, in order to achieve desired sensitivities, relatively thick CZT materials (approximately 10 mm or 12 mm) are used in conjunction with special processing of the signals to correct for losses of electrons that occur when the electrons must drift over a considerable distance (i.e. 5 mm or more). However, these thick pieces of CZT materials tend to be rare and expensive. Moreover, although these CZT materials can be divided into pixels, the pixel size is typically relatively large, thus limiting the spatial resolution and the total event rate. Another disadvantage involves the efficiency of the conversion of the incident gamma-rays into electrical energy (i.e. output current). Current CZT materials include defects that trap a portion of the charge carriers before they can complete their path to their respective contacts. As such, the output current is not a full representation of the total number of charge carriers generated, but rather is representative of only that portion of charge carriers that were not trapped by the defects.

Figure 1:
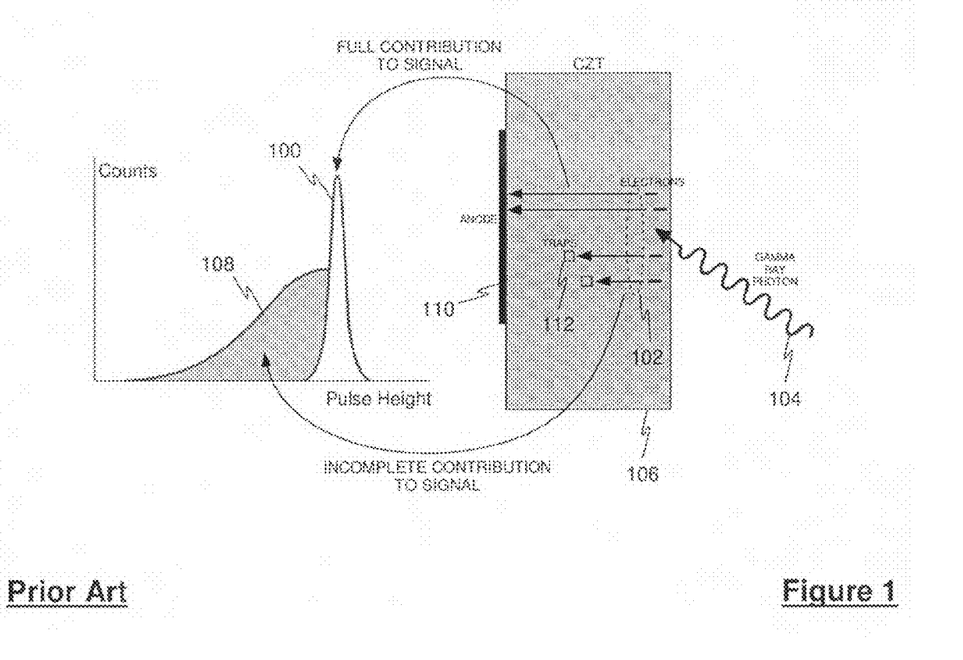
FIG. 1 is a plot of the output pulse height spectrum generated by gamma-rays incident upon a CZT detector, in accordance with the prior art.

This problem is illustrated in FIG. 1 which shows a plot of a pulse height spectrum 100 representing a complete contribution of charge carriers 102 generated by multiple gamma-ray photons 104, all having the same energy, incident upon a gamma-ray detector 106 constructed of CZT. Also illustrated is a plot of a pulse height spectrum 108 representing an incomplete contribution of charge carriers 102 generated by the multiple gamma-ray photons 104, all having the same energy, incident upon the CZT detector 106. As can be seen, after the incident gamma-ray 104 has been absorbed by the CZT material 106, if all of the electrons 102 reach the anode 110, then the resulting output current pulse has a pulse height representative of a complete contribution of the charge carriers 102, where, if many pulses of this kind can be collected, a narrow peak in the pulse height spectrum 100 will be built up. On the other hand, if electrons (i.e. charge carriers 102) are trapped by material defects 112 and are unable to complete their path to the anode 110, then the height of the current pulse will be reduced, where the percentage of electrons 102 lost will vary depending upon how far the absorption of the gamma-ray 104 occurred from the anode 110. Thus, the pulses from different gamma-rays will be degraded by different amounts even if the initial energy was the same.

This trapping problem is undesirable because it leads to a broad range of pulse heights, where in mild cases the peak in the pulse height spectrum 108 becomes wider and where in severe cases the peak in the pulse height spectrum 108 may be broadened and shifted down to where it may not be recognizable or reconstructable. Because the percentage of electrons lost will vary depending upon how far the gamma-ray absorption occurred from the anode, this electron trapping problem is typically more severe for thick CZT detectors than for thin CZT detectors. In fact, CZT detectors having a thickness on the order of about 10 mm or more require special electrodes and signal processing to extract a corrected height from a majority of the pulses. Unfortunately, these techniques tend to interfere with the goals of making a pixelated CZT detector that is simple to build and operate and even with special electrodes and signal processing, devices having a thickness greater than about 12 mm or 15 mm are typically not feasible.

SUMMARY OF THE INVENTION

A gamma-ray detector is provided and includes a plurality of detector elements arranged in a stacked configuration. Each of the plurality of detector elements may include a detector wafer, which may also be referred to as a substrate, having at least one anode separated from a cathode via a wafer material, wherein the wafer material includes a wafer material thickness d, and a wafer interface, wherein the wafer interface is electrically connected to the at least one anode.

Furthermore, a gamma-ray detector is provided and includes a plurality of detector wafers arranged in a stacked configuration such that when an incident gamma-ray passes through a first detector wafer of the plurality of detector wafers the gamma-ray encounters a second detector wafer of the plurality of detector wafers, wherein each of the plurality of detector wafers include at least one anode separated from a cathode via a detector wafer material.

Moreover, a method of detecting gamma-rays is provided, wherein the method includes receiving incident gamma-rays using a plurality of detector wafers arranged in a stacked configuration. Each of the plurality of detector wafers may include at least one anode separated from a cathode via a wafer material, wherein the at least one anode is electrically connected to at least one processing device. The method further includes detecting the presence of electron-hole pairs generated by the interaction of at least a portion of the incident gamma-rays with at least a portion of the plurality of detector wafers.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

As discussed hereinbefore, thinner CZT detectors, such as those that are approximately 2 mm or 3 mm in width, have a much shorter electron drift path than comparatively thicker CZT detectors, such as those that are approximately 10 mm in width. However, although this reduced thickness greatly decreases the effects of trapping on the charge carriers and allows for a sharper energy resolution in the pulse height spectrum than that achievable with thicker CZT detectors, these thinner CZT detectors tend to suffer from a reduced efficiency in capturing the energy of incident gamma-rays. Thus, in order to achieve desired levels of detection sensitivity and resolution, CZT material thicknesses of 10 mm or more have typically been required. Unfortunately, this is undesirable as well due to the difficulty and expense of obtaining CZT materials having these thicknesses. Thus, the need to increase the CZT material thickness for good sensitivity is currently in conflict with the need to decrease the CZT material thickness for efficient electron collection. The present invention addresses these disadvantages by providing a CZT detector that is scalable and manufacturable while still allowing for both sharp energy resolution and good detection efficiencies.

Figure 2:
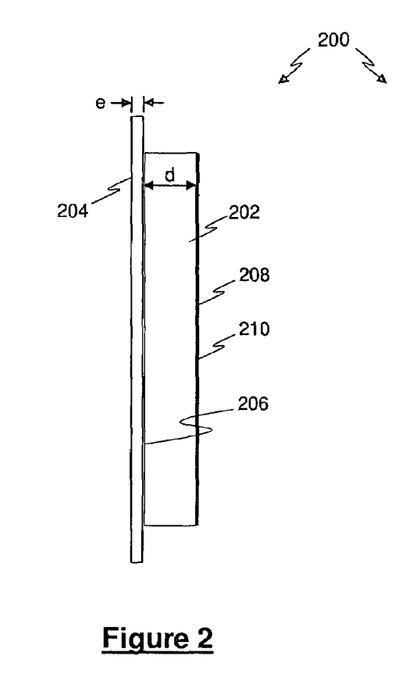
FIG. 2 is a side view of a detector element having a detector wafer associated with a wafer interface, in accordance with the present invention.
Figure 3:
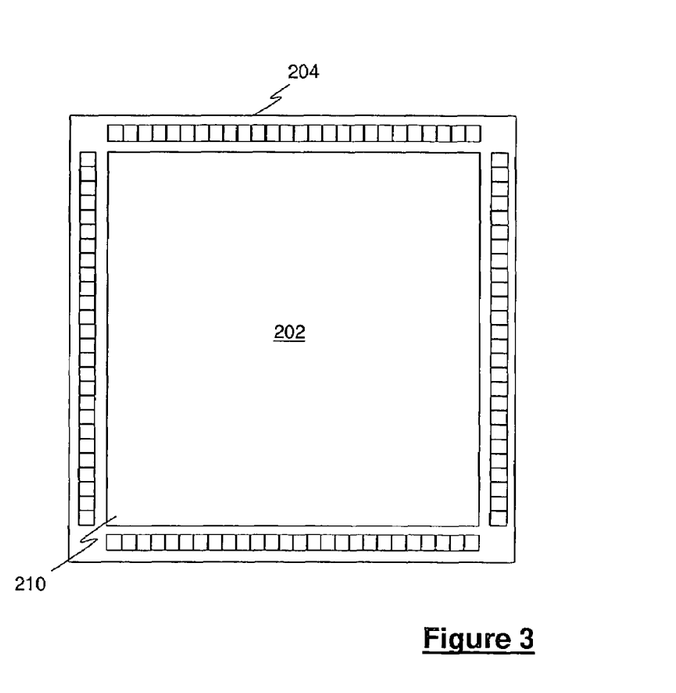
FIG. 3 is a front view of the detector element of FIG. 2, in accordance with the present invention.
Figure 4:
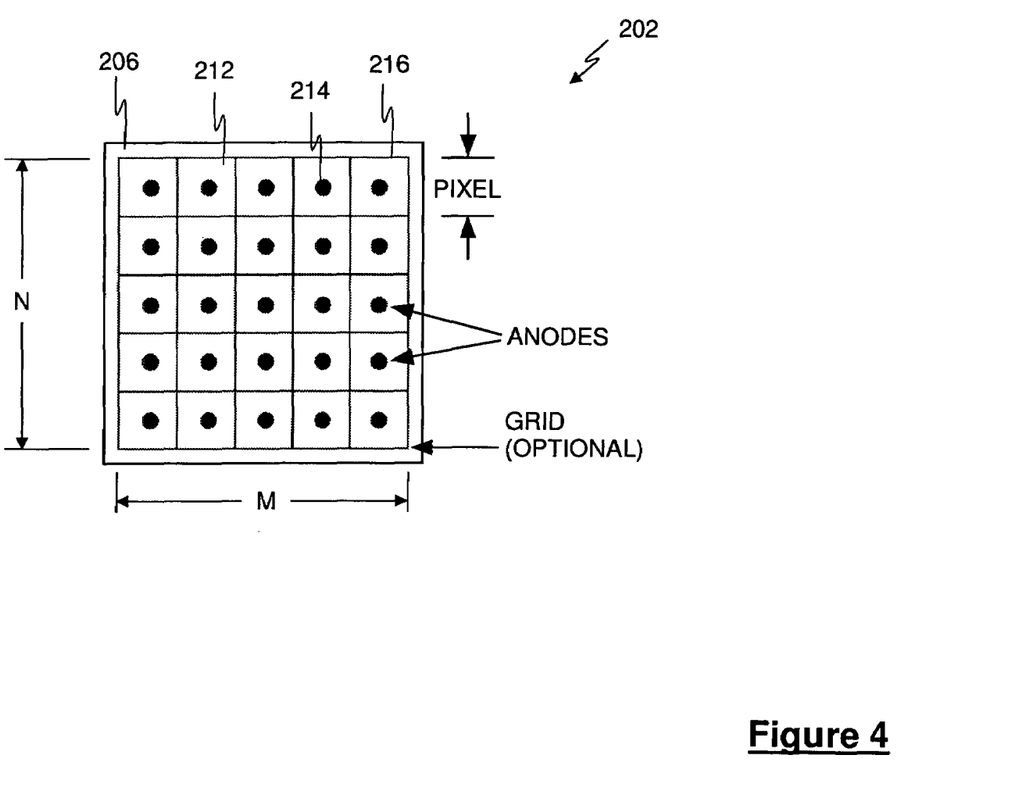
FIG. 4 is a front view of the wafer anode surface of the detector wafer in FIG. 2 showing an N×M array of pixels, in accordance with the present invention.
Figure 5:
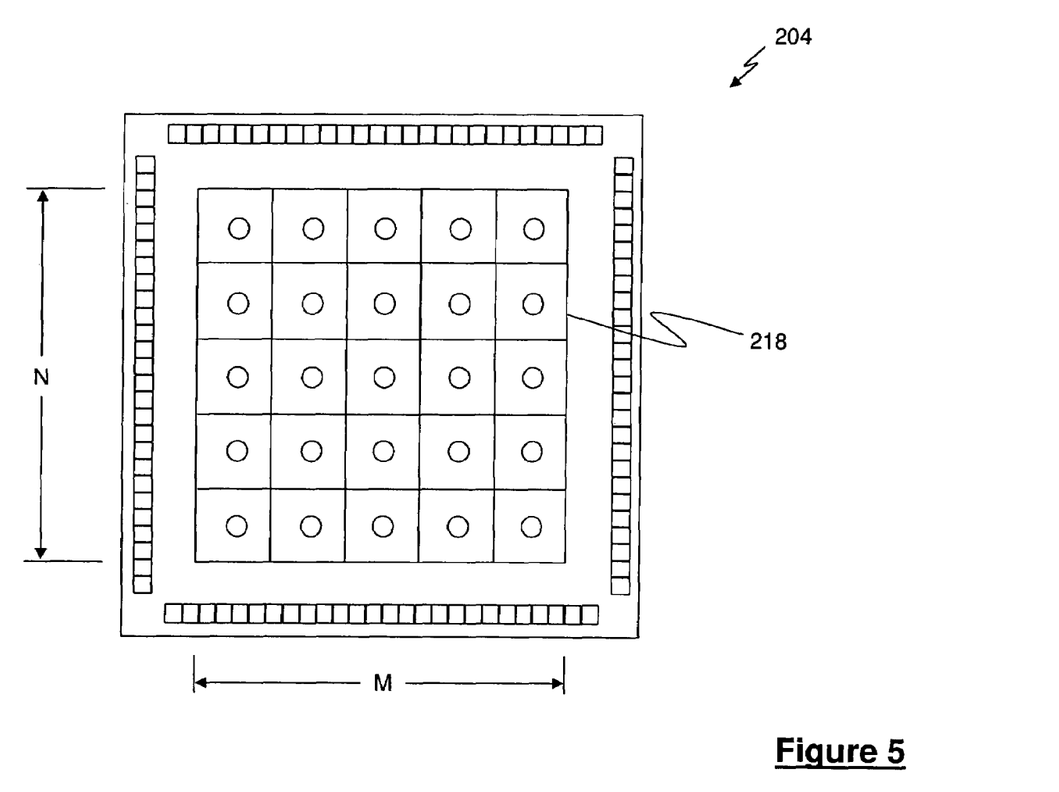
FIG. 5 is a front view of the wafer interface of FIG. 2 showing an N×M array of unit cells, in accordance with the present invention.
Figure 6:
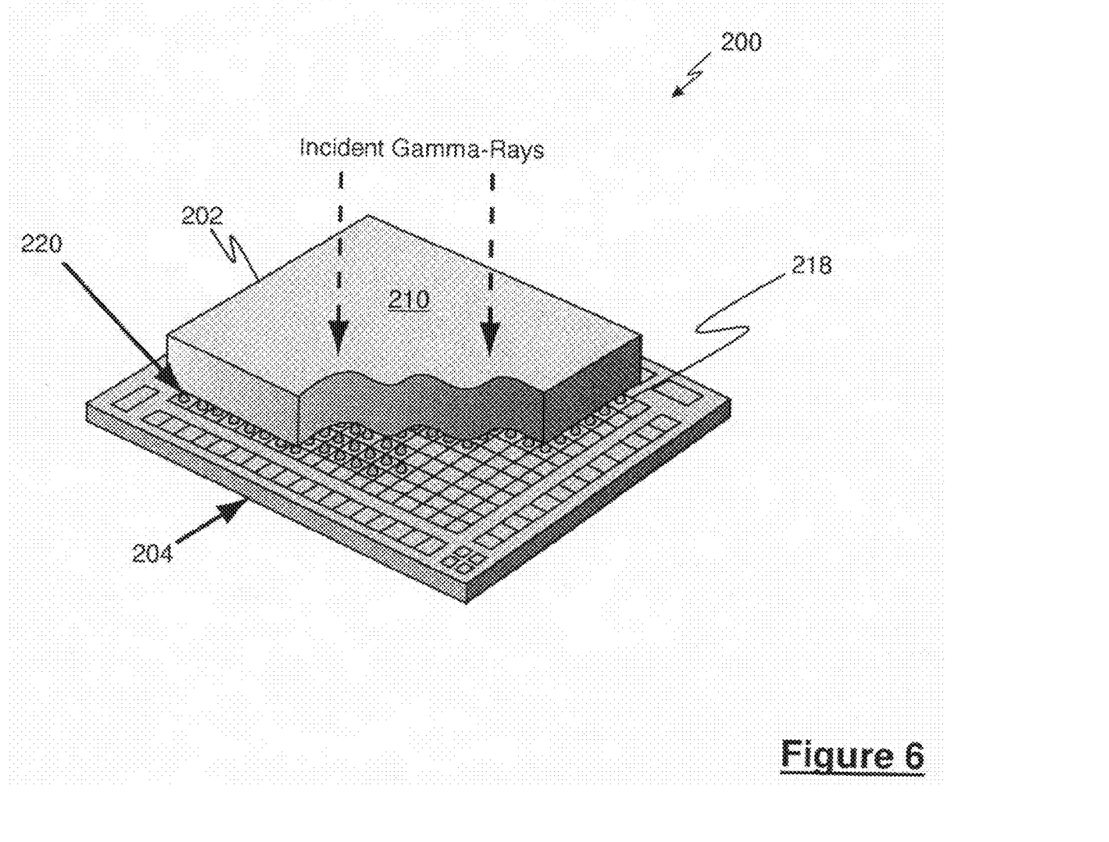
FIG. 6 is a cross-sectional perspective view of the detector element of FIG. 2 showing the interconnection between the detector wafer and the wafer interface, in accordance with the present invention.

Referring to FIG. 2 and FIG. 3, a detector element 200 in accordance with the present invention is shown and includes a detector wafer 202 having a wafer thickness d and a wafer interface 204 having an interface thickness e, wherein the detector wafer 202 also includes a wafer anode surface 206 and a wafer cathode surface 208 having a continuous metal film or cathode 210. The detector wafer 202 may also be referred to herein without a loss of generality as a detector substrate. Referring to FIG. 4, the wafer anode surface 206 is divided into an N×M array of pixels 212, each of which include an anode contact 214 disposed in the center portion of the pixel 212. It should be appreciated that an optional metal grid 216 may also be provided and disposed on the wafer anode surface 206 to help define the boundaries of the pixels 212 and to help control the surface potential across the wafer anode surface 206. Referring to FIG. 5 and FIG. 6, the wafer interface 204 includes an N×M array of unit cells 218, wherein the N×M array of unit cells 218 is configured such that when the detector wafer 202 is connected with the wafer interface 204, each pixel 212 of the N×M array of pixels 212 mates with one of the unit cells 218 of the N×M array of unit cells 218. Each of the unit cells 218 on the wafer interface 204, which may also include an application specific integrated circuit (ASIC) for processing signals received from the detector wafer 202, may be electrically connected to a corresponding anode contact 214 on the detector wafer 202 via any electrical contact method or device suitable to the desired end purpose, such as a bump bond 220. It should be appreciated that the ASIC not only allows for the determination of the amount of energy deposited in each of the unit cells 218 by a radiation event, but also allows for the determination of the timing of the event.

Figure 7:
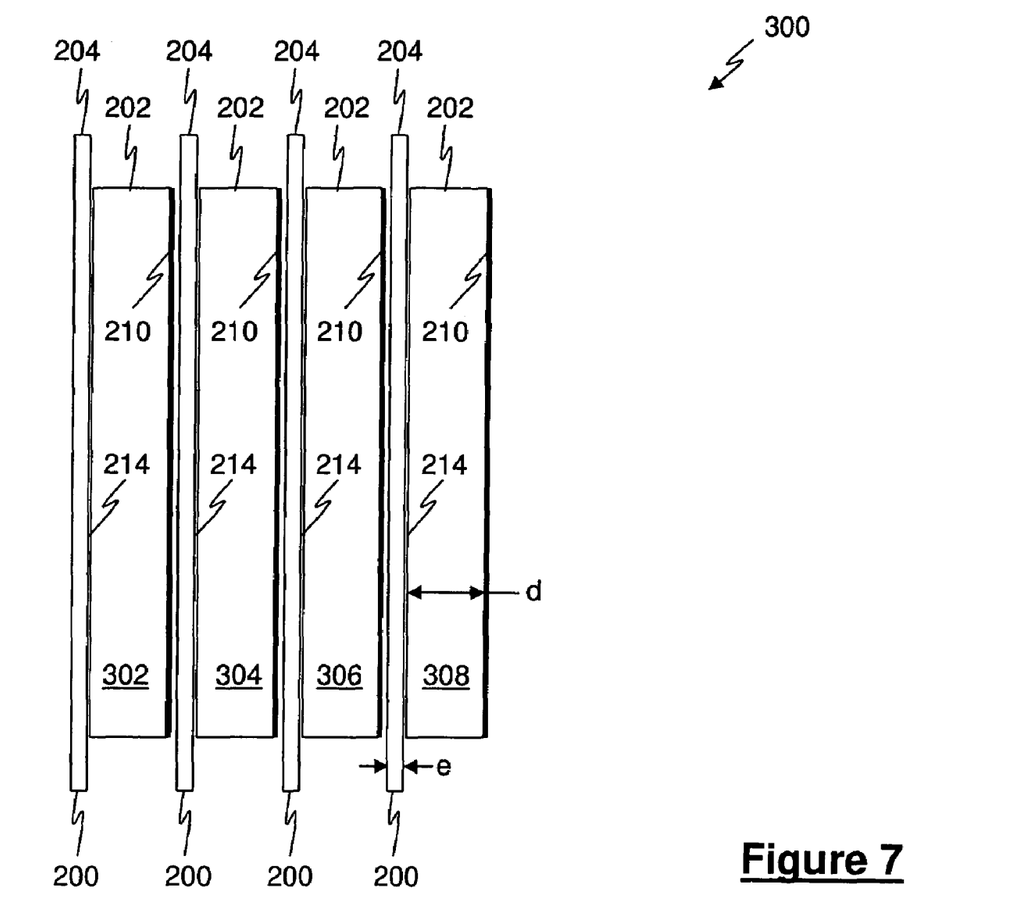
FIG. 7 is a first embodiment of a detection device including a plurality of the detector elements of FIG. 2 in a stacked configuration, in accordance with the present invention.

Referring to FIG. 7, a first embodiment of a detector device 300, in accordance with the present invention, is shown and includes a plurality of detector elements 200 stacked together in a sandwich or layered configuration. It should be appreciated that for illustrative purposes the detector device 300 is shown as including four (4) detector elements 200. However, it is contemplated that the detector device 300 may include any number of detector elements 200 suitable to the desired end purpose. The detector device 300 includes a first detector element 302, a second detector element 304, a third detector element 306 and a fourth detector element 308, wherein each of the first detector element 302, second detector element 304, third detector element 306 and fourth detector element 308 are configured as detector element 200 to include a wafer interface 204 and a detector wafer 202 having an anode 214 and a cathode 210.

As shown in FIG. 7, the detector device 300 is configured such that the second detector element 304 and third detector element 306 are sandwiched or layered between the first detector element 302 and fourth detector element 308, wherein the wafer interface 204 of the second detector element 304 is disposed adjacent the cathode 210 of the first detector element 302 and the cathode 210 of the second detector element 304 is disposed adjacent the wafer interface 204 of the third detector element 306. Additionally, the fourth detector element 308 is disposed such that the wafer interface 204 of the fourth detector element 308 is disposed adjacent the cathode 210 of the third detector element 306.

Each of the detector wafers 202 are shown as having a wafer thickness d equal to approximately 2.5 mm and have a wafer area of approximately 30 mm×30 mm. As such, when the four (4) detector elements 302, 304, 306, 308 are stacked together to form the detector device 300, the total wafer thickness is approximately 10 mm and the combined wafer volume is approximately 9 cm$^3$. Moreover, each of the detector wafers 202 include 2500 pixels 212 (each having an anode contact 214) arranged on the wafer anode surface 206 in a 50×50 array. Additionally, each of the wafer interfaces are shown as having an interface thickness e equal to approximately 0.5 mm and include 2500 unit cells 218, each of which has a unit cell width of 0.6 mm. This provides for a combined pixel count of 10,000 and a ratio of 4.17 between the thickness d of the detector wafer 202 and the width of the pixels 212 that is essentially the same as the preferred ratio of 4 for a small pixel device. It should be appreciated that in order for a detector element 200 to operate efficiently, a typical electric field of approximately 1000 V/cm is required within the detector wafer 202. This may be established by keeping the anode contacts 214 (which are close to the interface wafer 204) of detector element 200 close to ground potential while applying a −250 volt (V) potential to the cathode 210 of the detector element 200. However, in some cases it may be beneficial to give the transport of electrons a boost by applying a −500 volt (V) potential to the cathode 210 of the detector element 200 to increase the electric field up to approximately 2000 V/cm.

Figure 8:
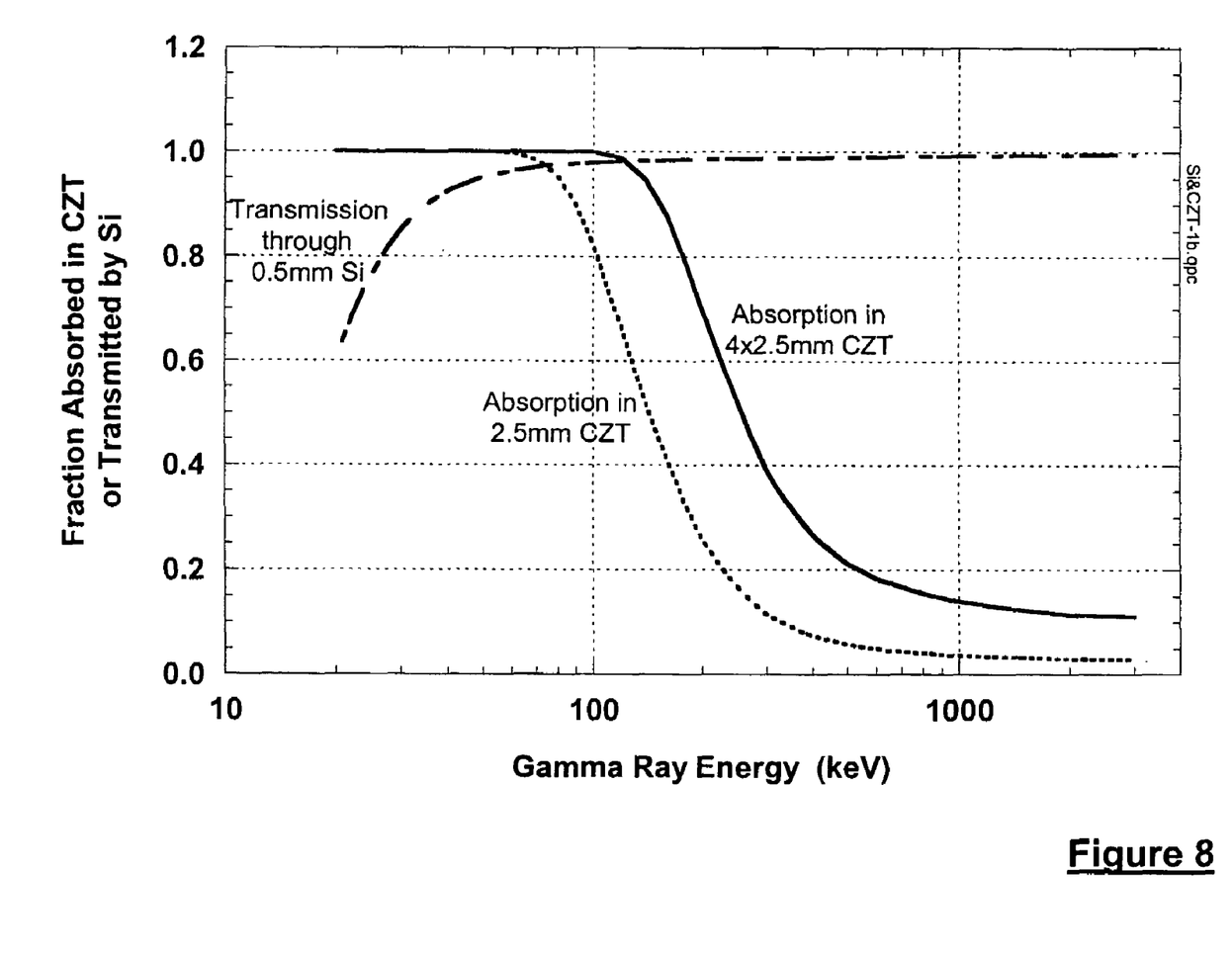
FIG. 8 is a graph illustrating a comparison of the energy absorbed for a single detector wafer and four (4) detector wafers, in accordance with the present invention.

It should be appreciated that any given gamma-ray can interact and deposit its energy in the detector element 200 by several different mechanisms. Referring to FIG. 8, a weighted average of these mechanisms are illustrated for the region of application for the present invention, which is primarily between approximately 100 keV and 3000 keV. As can be seen, not only is very little energy lost in the wafer interface 204, but a significant gain of efficiency is achieved by using multiple detector elements 200 stacked in layers, as compared to a single detector element 200. Thus, stacking detector elements 200 in multiple levels is more efficient than 'spreading out' the same number of detector elements 200 in a single layer arrangement. One reason for this is that the energy absorption mechanisms involve secondary effects that expand the volume of the detection wafer 202 in which the energy deposition occurs. As such, when a gamma-ray first interacts with a detection wafer 202, some of its energy is transmitted deeper into the detector device and thus, can be captured only if the detection wafer 202 is sufficiently thick. This 'sufficient' thickness is simulated by stacking the detector elements 200 in layers to achieve multiple levels.

Figure 9:
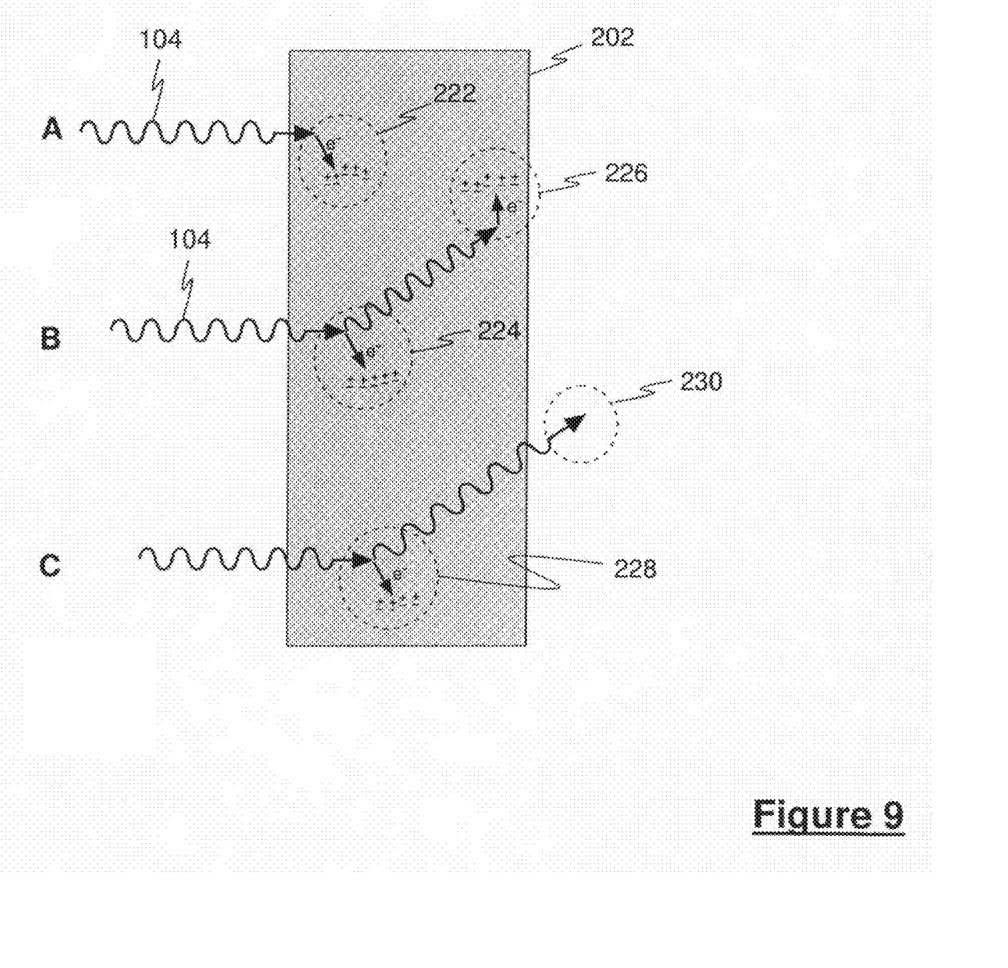
FIG. 9 is a cross-sectional side view of a detector wafer with several gamma-rays incident on the wafer.

Although many complex physical mechanisms are involved in the transfer of energy from the gamma-ray to the detector wafer 202, the following relatively simple illustrations may aid in explanation. Referring to FIG. 9, consider three (3) different situations, Case A, Case B and Case C. Case A illustrates a photoelectric event 222, where all of the original energy from a gamma-ray 104 that is incident on a detector wafer 202 is transferred to one electron, which in turn transfers its energy to thousands of other electrons. Case B, on the other hand, illustrates a photoelectric event 224 where the first interaction involves Compton Scattering in which only some of the energy is transferred to an electron and the remaining energy continues on as a secondary gamma-ray of reduced energy. This secondary gamma-ray is subsequently captured by an additional photoelectric event 226. In both Case A and Case B, the full energy of the original gamma-ray 104 is captured and converted into electron hole pairs. Case C, however, illustrates a photoelectric event 228 where the first interaction involves Compton Scattering in which some of the energy is transferred to an electron and the remaining energy continues on as a secondary gamma-ray 230 of reduced energy. The secondary gamma-ray 230 though is not captured by an additional photoelectric event and thus escapes the detector wafer 202. In this case, the original gamma-ray energy cannot be determined because the amount of energy that escapes is not known.

Figure 10:
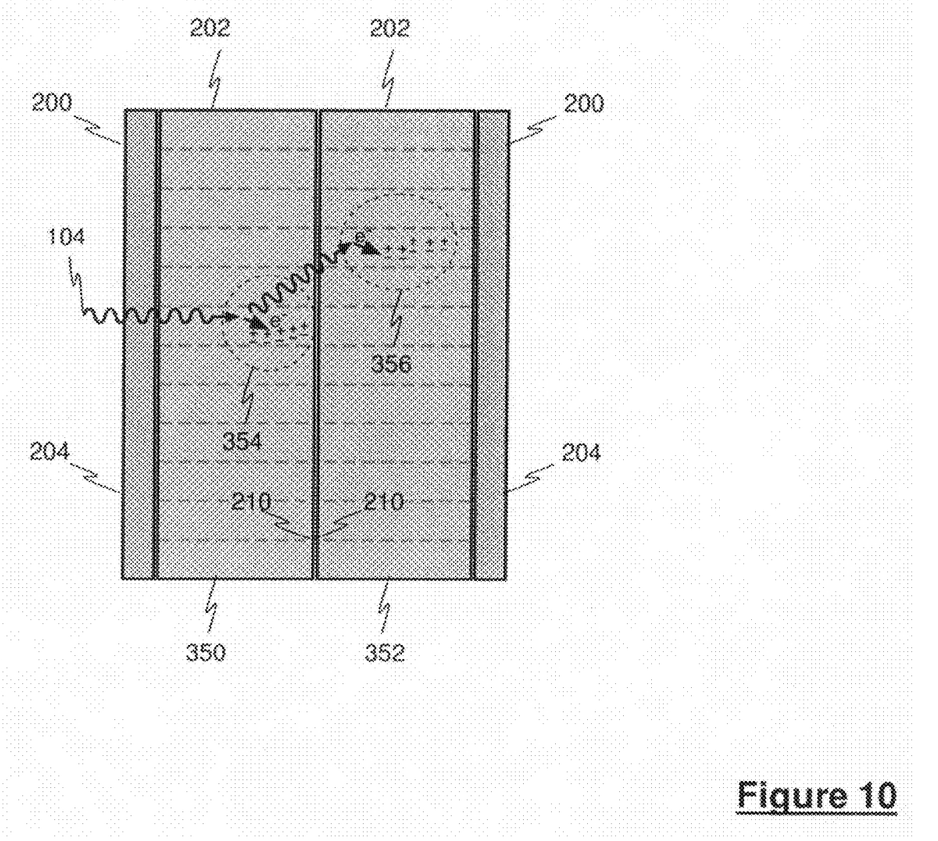
FIG. 10 is a cross-sectional side view of two of the detector elements of FIG. 2 sandwiched together, in accordance with the present invention.

It is contemplated that in the detection device 300 some of the secondary energy capture mechanisms are expected to occur in the detection elements 200 disposed behind the detection element 200 in which the first gamma-ray interaction occurred. Referring to FIG. 10, a plurality of photoelectric events is shown occurring in a plurality of detector elements 200 arranged in a stacked configuration, in accordance with the present invention. The plurality of detector elements 200 include a first detector element 350 and a second detector element 352, wherein the first detector element 350 and second detector element 352 are arranged such that the cathode 210 of the first detector element 350 is disposed adjacent the cathode 210 of the second detector element 352. In this case, a gamma-ray 104 is shown incident on a first detection element 350 where the first photoelectric event 354 involves Compton Scattering in which some of the energy is transferred to an electron and the remaining energy continues on as a secondary gamma-ray of reduced energy. The secondary gamma-ray though is not captured by an additional photoelectric event and thus escapes from the first detection element 350 and becomes incident on the second detection element 352 where energy of the secondary gamma-ray is captured via a photoelectric event 356.

Figure 11:
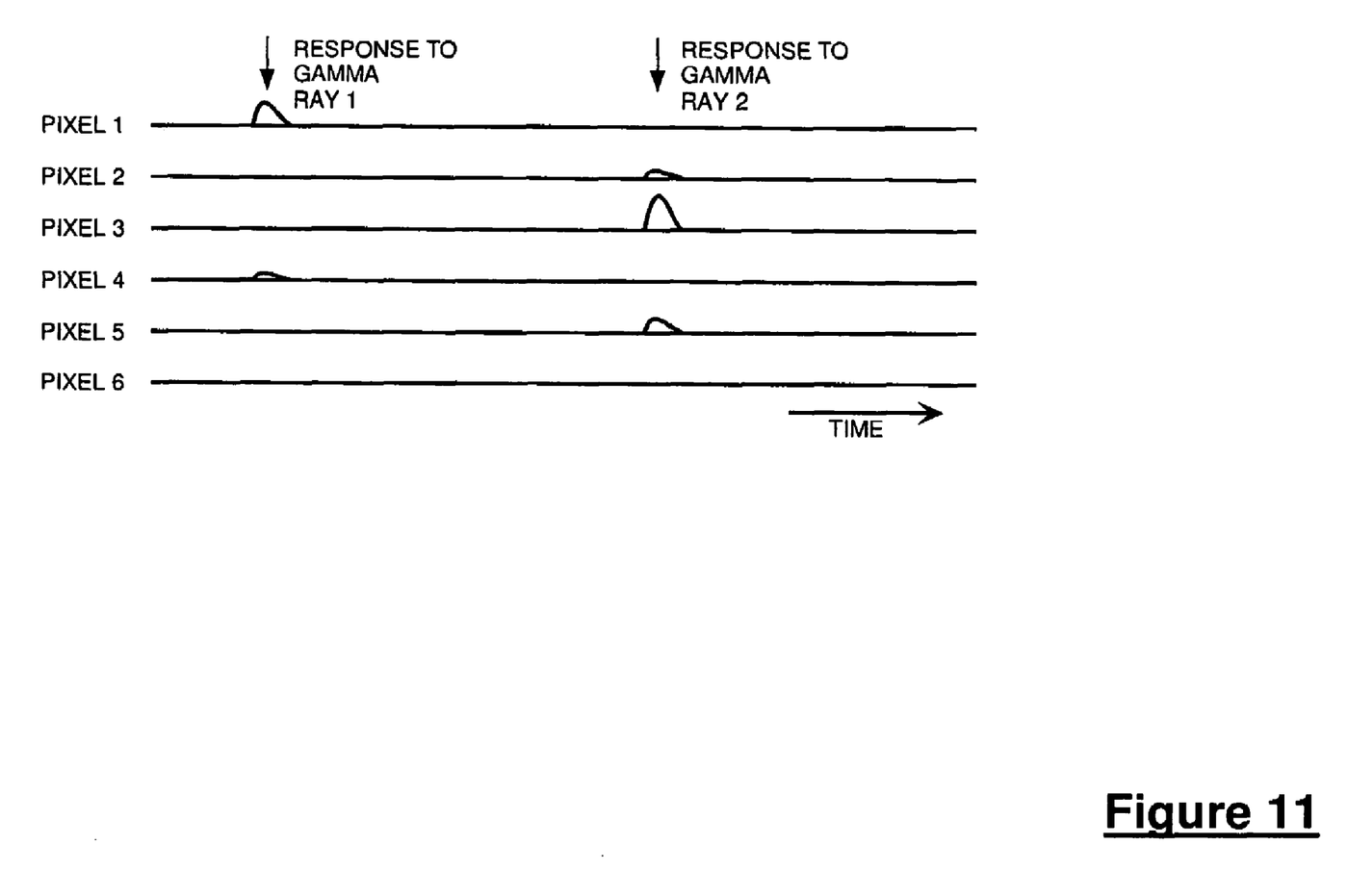
FIG. 11 is a plot current versus time for several pixels of the two detector elements of FIG. 10, in accordance with the present invention.

In accordance with the present invention, as gamma-rays become incident on detection device 300, the ASICS in the interface wafers 204 may continuously monitor each pixel 212 and collect the charge carried by the electron current following a radiation event. Referring to FIG. 11, the time of each event will also be recorded and events that occur in separate pixels 212 simultaneously (as may be determined by a predefined small time interval Δt) will be assumed to belong to the same original gamma-ray and their signals will be added together to reconstruct the full pulse. For example, the pulses corresponding to gamma-ray 1 (i.e. in pixels 1 and 4) will be added together and the pulses corresponding to gamma-ray 2 (i.e. in pixel 2, 3 and 5) will be added together. This assumption is possible because extremely high flux rates are not expected in spectroscopic applications, making it unlikely that two (2) gamma-rays will hit the device within the predefined time interval Δt.

Figure 12:
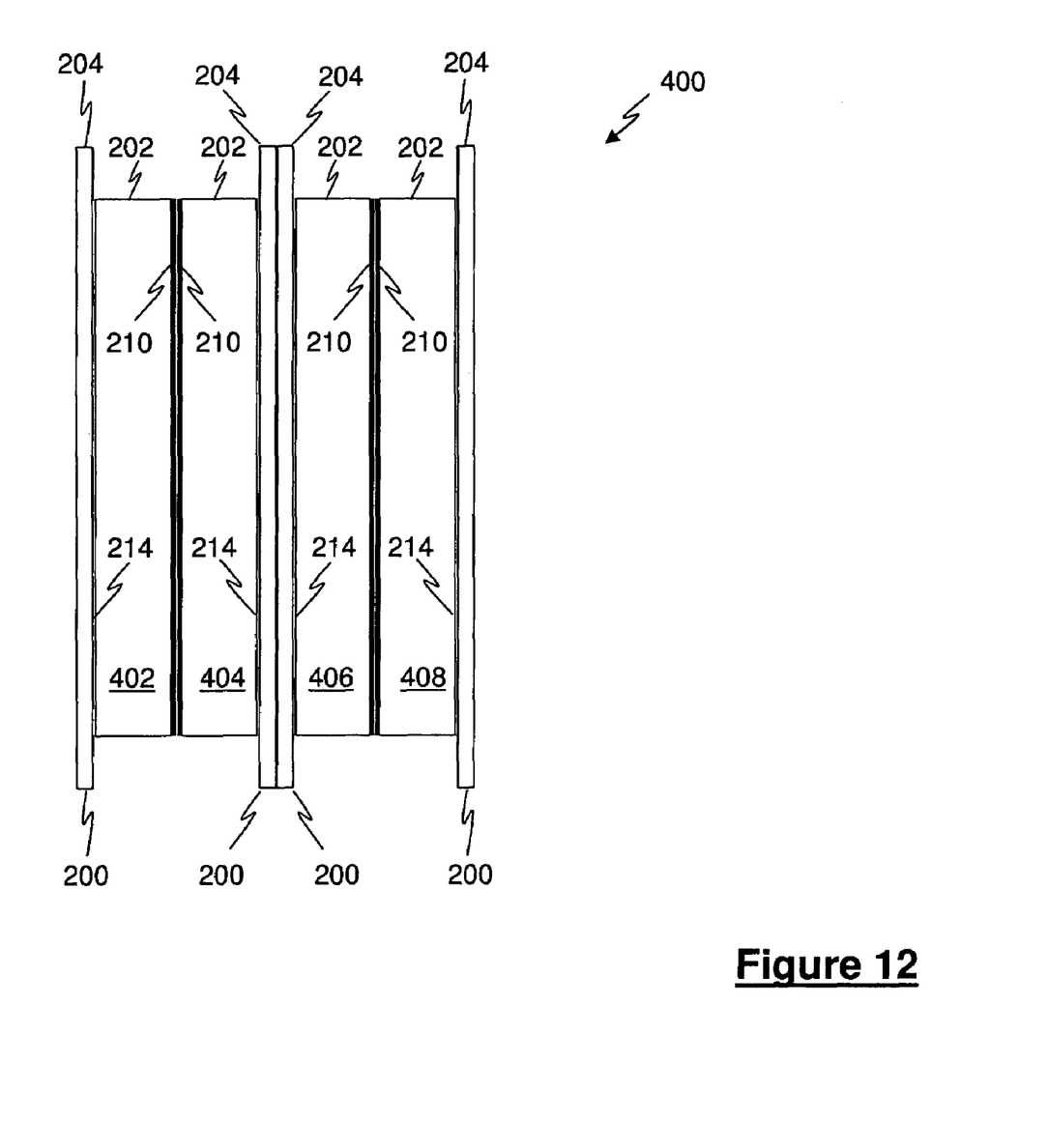
FIG. 12 is a second embodiment of a detection device including a plurality of the detector elements of FIG. 2 in a stacked configuration, in accordance with the present invention.

Referring to FIG. 12, a second embodiment of a detector device 400, in accordance with the present invention, is shown and includes a plurality of detector elements 200 stacked together in a sandwich or layered configuration similar to that in FIG. 7. As above, it should be appreciated that for illustrative purposes the detector device 400 is shown as including four (4) detector elements 200. However, it is contemplated that the detector device 400 may include any number of detector elements 200 suitable to the desired end purpose. The detector device 400 includes a first detector element 402, a second detector element 404, a third detector element 406 and a fourth detector element 408, wherein each of the first detector element 402, second detector element 404, third detector element 406 and fourth detector element 408 are configured as detector element 200 to include a wafer interface 204 and a detector wafer 202 having an anode 214 and a cathode 210.

As shown in FIG. 12, the detector device 400 is configured such that the second detector element 404 and third detector element 406 are sandwiched or layered between the first detector element 402 and fourth detector element 408, wherein the wafer interface 204 of the second detector element 404 is disposed adjacent the wafer interface 204 of the third detector element 406. As such, the cathode 210 of the first detector element 402 is adjacent the cathode 210 of the second detector element 404 and the cathode 210 of the third detector element 406 is adjacent the cathode 210 of the fourth detector element 408. It should be appreciated that one advantage that the detector device 400 has is that the high negative voltages are 'together' and thus, the low energy secondary photons (<100 keV), such as fluorescence x-rays, can propagate into the adjacent detector wafer 202 without having to pass through the interface wafer 204.

It should be appreciated that for the detector device 300, 400, although the thickness d of the detector wafer 202 is shown as being approximately 2.5 mm-3 mm, it is contemplated that the thickness of the detector wafer 202 may increase responsive to improvements in quality of detector wafer materials.

Figure 13:
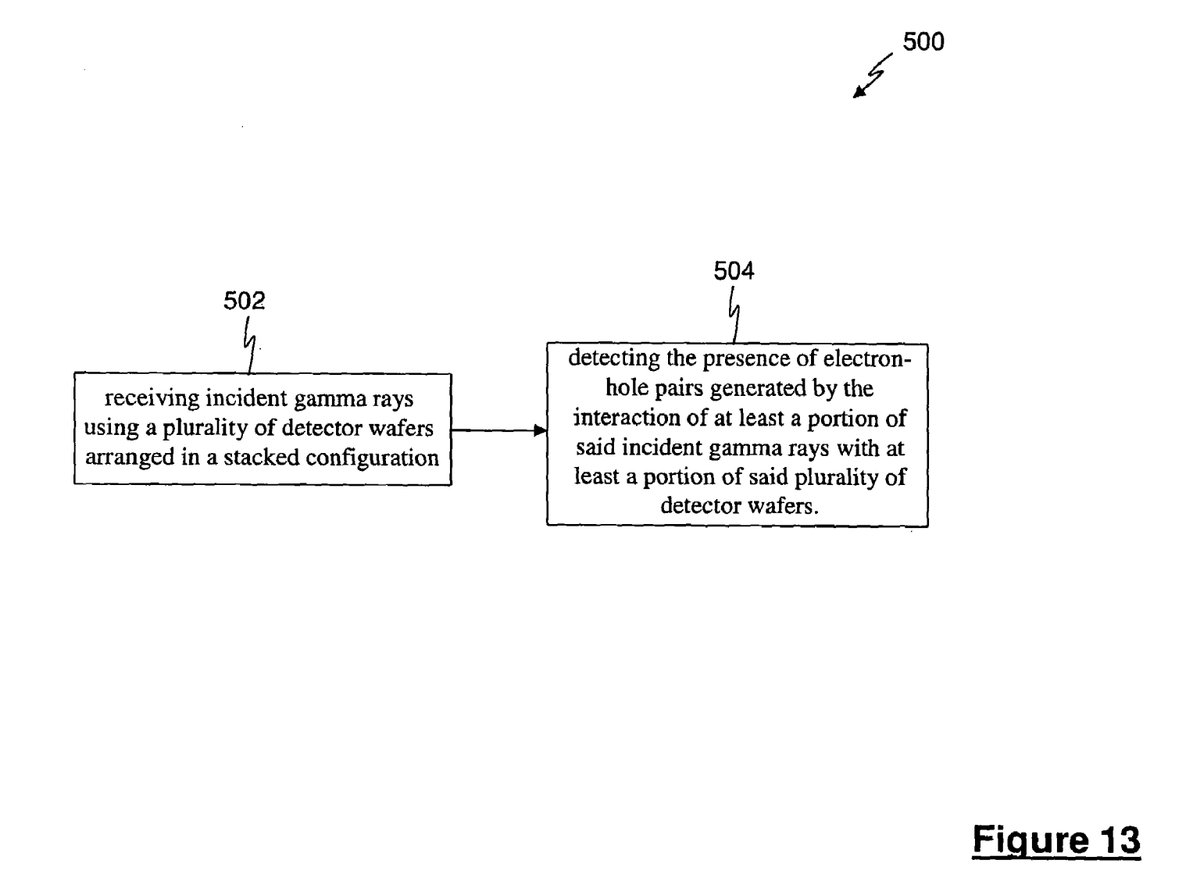
FIG. 13 is a block diagram describing a method for detecting gamma-rays, in accordance with the present invention.

Referring to FIG. 13, a block diagram illustrating a method 500 of detecting gamma-rays is shown and includes receiving incident gamma-rays using a plurality of detector wafers 202 arranged in a stacked configuration, as shown in operational block 502. This may be accomplished by obtaining and positioning a detector device 300, 400 such that incident gamma-rays interact with at least a portion of the detector wafers 202 in the detector device 300, 400 to generate electron-hole pairs. The method 500 further includes detecting the presence of the electron-hole pairs, as shown in operational block 504. This may be accomplished by the processing devices (ASICs) that are associated with each of the units cells and that are electrically connected to the anodes 214. The received signals may then be processed further to generate a spectrum of electrical pulses responsive to the received gamma-rays. It should be appreciated that the present invention contemplates that a single processing device may be used to receive and process the signals from the anodes and/or a plurality of processing devices may be used to receive and process the signals from the anodes, such as a processing device for each unit cell.

It is contemplated that the method 500 of FIG. 13, in whole or in part, may be embodied in the form of computer-implemented processes and apparatuses for practicing those processes. Additionally, the method 500 of FIG. 13, in whole or in part, may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may also be updated to implement the method 500 of FIG. 13, in whole or in part.

Also, as described above, the method 500 of FIG. 13, in whole or in part, may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A gamma-ray detector, comprising:
a plurality of detector elements arranged in a stacked configuration, wherein each of said plurality of detector elements include,
a detector wafer having a plurality of anodes separated from a cathode via a wafer material, wherein said wafer material includes a wafer material thickness d, and
a wafer interface including a plurality of unit cells arranged in an N×M array, wherein each of said plurality of unit cells is electrically connected to a corresponding anode of said plurality of anodes, wherein said wafer interface is electrically connected to said at least one anode, wherein each of said plurality of unit cells include at least one processing device for processing electrical signals received from said corresponding anode.

2. The gamma-ray detector of claim 1, wherein said plurality of detector elements include a first detector element, a second detector element, a third detector element and a fourth detector element.

3. The gamma-ray detector of claim 2, wherein said plurality of detector elements are arranged in said stacked configuration such that said cathode of said first detector element is adjacent said wafer interface of said second detector element, said cathode of said second detector element is adjacent said wafer interface of said third detector element and said cathode of said third detector element is adjacent said wafer interface of said fourth detector element.

4. The gamma-ray detector of claim 2, wherein said plurality of detector elements are arranged in said stacked configuration such that said cathode of said first detector element is adjacent said cathode of said second detector element, said cathode of said third detector element is adjacent said cathode of said fourth detector element and said wafer interface of said second detector element is adjacent said wafer interface of said third detector element.

5. The gamma-ray detector of claim 1, wherein said wafer material thickness d is between about 2.5 mm and about 3.0 mm.

6. The gamma-ray detector of claim 1, wherein said wafer interface includes a wafer interface thickness e of about 0.5 mm.

7. The gamma-ray detector of claim 1, said detector wafer further including a plurality of pixels arranged in an N×M array, each of said plurality of pixels including one of said plurality of anodes.

8. The gamma-ray detector of claim 1, wherein said detector wafer includes 2500 pixels, arranged in a 50×50 array, each of said 2500 pixels including one of said plurality of anodes and wherein said wafer interface includes 2500 unit cells arranged in a 50×50 array, each of said 2500 unit cells being electrically connected to a corresponding anode of said plurality of anodes.

9. The gamma-ray detector of claim 1, wherein said wafer interface includes at least one processing device for processing electrical signals received from said detector wafer.

10. The gamma-ray detector of claim 1, wherein at least one of said wafer material includes Cadmium Zinc Telluride (CdZnTe) and said wafer interface is at least partially constructed from silicon.

11. A gamma-ray detector, comprising:
a plurality of detector wafers arranged in a stacked configuration such that when an incident gamma-ray passes through a first detector wafer of said plurality of detector wafers said gamma-ray encounters a second detector wafer of said plurality of detector wafers, wherein each of said plurality of detector wafers include at least one anode separated from a cathode via a detector wafer material; and
at least one processing device configured to construct an electrical pulse by adding a signal resulting from the gamma ray passing through the first detector wafer and another signal resulting from the gamma ray encountering the second detector wafer.

12. The gamma-ray detector of claim 11, wherein each of said plurality of detector wafers includes a wafer interface having at least one unit cell electrically connected to said at least one anode, wherein said at least one unit cell is further electrically connected with at least one processing device.

13. The gamma-ray detector of claim 12, wherein said plurality of detector wafers include a first detector wafer having a first cathode and a first wafer interface, a second detector wafer having a second cathode and a second wafer interface, a third detector wafer having a third cathode and a third wafer interface and a fourth detector wafer having a fourth cathode and a fourth wafer interface.

14. The gamma-ray detector of claim 13, wherein said plurality of detector wafers are arranged in said stacked configuration such that at least one of,
said first cathode is adjacent said second wafer interface, said second cathode is adjacent said third wafer interface and said third cathode is adjacent said fourth wafer interface, and
said first cathode is adjacent said second cathode, said third cathode is adjacent said fourth cathode and said second wafer interface is adjacent said third wafer interface.

15. The gamma-ray detector of claim 12, wherein at least one of said detector wafer material includes Cadmium Zinc Telluride (CdZnTe) and said wafer interface includes silicon.

16. A method of detecting gamma-rays, comprising:
receiving incident gamma-rays using a plurality of detector wafers arranged in a stacked configuration, wherein each of said plurality of detector wafers include at least one anode separated from a cathode via a wafer material, wherein said at least one anode is electrically connected to at least one processing device;
detecting the presence of electron-hole pairs generated by the interaction of at least a portion of said incident gamma-rays with at least a portion of said plurality of detector wafers; and
for at least one of the incident gamma rays that is assumed to pass through one of the plurality of detector wafers and to encounter at least one other of the plurality of detector wafers in the stacked configuration. reconstructing a full pulse by adding signals from the electron-hole pairs detected in the one detector wafer and in the at least one other detector wafer.

17. The method of claim 16, wherein said detecting includes,
detecting an electrical signal responsive to said presence of electron-hole pairs via at least one processing device, and
processing said electrical signal to generate a spectrum of electrical pulses.

18. A gamma-ray detector, comprising:
means for receiving incident gamma-rays comprising a plurality of detector wafers arranged in a stacked configuration, wherein each of said plurality of detector wafers include at least one anode separated from a cathode via a wafer material, wherein said at least one anode is electrically connected to at least one processing means; and
means for detecting the presence of electron-hole pairs generated by the interaction of at least a portion of said incident gamma-rays with at least a portion of said plurality of detector wafers; and
means for reconstructing a full pulse for at least one of the incident gamma rays by adding signals from the electron-hole pairs detected in one of the plurality of detector wafers and in at least one other of the plurality of detector wafers in the stacked configuration for the at least one incident gamma ray that is assumed to pass through the one of the detector wafers and to encounter the at least one other of the plurality of detector wafers.

19. The gamma-ray detector of claim 18, wherein said means for detecting and the means for reconstructing includes,
means for detecting an electrical signal responsive to said presence of electron-hole pairs via at least one processing device, and
means for processing said electrical signal to generate a spectrum of electrical pulses.

* * * * *